United States Patent
Shen et al.

(10) Patent No.: US 7,881,007 B2
(45) Date of Patent: Feb. 1, 2011

(54) UNEQUAL ZONING FOR TRACK FOLLOWING ON A HARD DISK DRIVE

(75) Inventors: Jr-Yi Shen, Sunnyvale, CA (US); Zhi Wang, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/429,129

(22) Filed: Apr. 23, 2009

(65) Prior Publication Data

US 2010/0271731 A1    Oct. 28, 2010

(51) Int. Cl.
G11B 5/596 (2006.01)
(52) U.S. Cl. .................................. 360/77.02
(58) Field of Classification Search .............. None
See application file for complete search history.

(56) References Cited

U.S. PATENT DOCUMENTS

| | | | |
|---|---|---|---|
| 6,141,175 A | 10/2000 | Nazarian et al. | |
| 6,377,417 B1 | 4/2002 | Ahn | |
| 6,847,503 B2 | 1/2005 | Zhang et al. | |
| 6,859,341 B2 | 2/2005 | Min et al. | |
| 6,898,047 B2 * | 5/2005 | Shishida et al. | 360/77.04 |
| 6,963,466 B2 | 11/2005 | Baum et al. | |
| 7,085,094 B1 | 8/2006 | Heimbaugh et al. | |
| 7,088,547 B1 * | 8/2006 | Wang et al. | 360/77.04 |
| 7,119,981 B2 * | 10/2006 | Hanson et al. | 360/77.04 |
| 7,139,149 B1 * | 11/2006 | Sun et al. | 360/77.04 |
| 7,193,808 B2 * | 3/2007 | Takaishi | 360/77.04 |
| 7,251,097 B2 | 7/2007 | Hanson et al. | |
| 2004/0021977 A1 | 2/2004 | Lim et al. | |

FOREIGN PATENT DOCUMENTS

| | | |
|---|---|---|
| JP | 2000-315363 | 11/2000 |
| JP | 2006-048913 | 2/2006 |
| JP | 2007-012258 | 1/2007 |

OTHER PUBLICATIONS

Sacks, et al., "Advanced Methods for Repeatable Runout Compensation", *IEEE Transactions on Magnetics*, vol. 31, No. 2, (Mar. 1995),1031-1036.

(Continued)

*Primary Examiner*—K. Wong

(57) ABSTRACT

Unequal zoning for track following on a hard disk drive comprising at least one magnetic disk, a read/write head connected to at least one actuator arm and capable of reading and writing data on said at least one magnetic disk, a controller capable of moving said at least one actuator arm. A track is followed using the read/write head on the surface of the at least one magnetic disk. Information is stored at the controller regarding off-track displacement of the read/write head. A plurality of unequal zone partitions is created, wherein an unequal zone partition of the plurality of unequal zone partitions represents a physical region of the at least one magnetic disk and wherein the plurality of unequal zone partitions are based on the information regarding the off-track displacement of the track and are used by the controller to compensate for the off-track displacement of the track.

20 Claims, 6 Drawing Sheets

OTHER PUBLICATIONS

Zheng, et al., "Optimal Narrow-Band Disturbance Filter for PZT-Actuated Head Positioning Control on a Spinstand", *IEEE Transactions on Magnetics*, vol. 42, No. 11, (Nov. 2006),3745-3751.

Arancibia, et al., "Adaptive-Repetitive Control of a Hard Disk Drive", *Proceedings of the 46th IEEE Conference on Decision and Control*, (Dec. 2007),4519-4524.

Liu, et al., "Active Runout Cancellation for Fine-Seeking Control in Optical Disk Drives", *Optimal Control Applications and Methods*, (Dec. 20, 2007),1-2.

* cited by examiner

300

```
┌─────────────────────────────────────────────┐
│ A track is followed using the read/write head on the surface │
│        of the at least one magnetic disk.        │
│                     302                     │
└─────────────────────────────────────────────┘
                        │
                        ▼
┌─────────────────────────────────────────────┐
│ Information is stored at the controller regarding off-track │
│        displacement of the read/write head.        │
│                     304                     │
└─────────────────────────────────────────────┘
                        │
                        ▼
┌─────────────────────────────────────────────┐
│ A plurality of unequal zone partitions is created, wherein an │
│ unequal zone partition of the plurality of unequal zone partitions │
│ represents a physical region of the at least one magnetic disk │
│ and wherein the plurality of unequal zone partitions are based │
│ on the information regarding the off-track displacement of the │
│ track and are used by the controller to compensate for the off- │
│                track displacement of the track.                │
│                            306                            │
└─────────────────────────────────────────────┘
```

Rotating a magnetic disk capable of storing data.
402

Following a track on a surface of said magnetic disk with a read/write head capable of reading and writing information on the magnetic disk.
404

Accessing information regarding a plurality of unequal zone partitions, an unequal zone partition of the plurality of unequal zone partitions represents a physical region of the magnetic disk.
406

Compensating for off-track displacement of the track on the surface of the magnetic disk by moving the read/write head using a different constant value for compensation for the unequal zone partition.
408

FIG. 4

UNEQUAL ZONING FOR TRACK FOLLOWING ON A HARD DISK DRIVE

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model uses a read/write head to read and write information or data on a magnetic disk. In some operations, as the magnetic disk spins, the read/write head follows a track or path along the surface of the magnetic disk. Disturbances or deformations, due to mechanical root cause, may occur as the disk spins. These disturbances or deformations cause off-track displacement as the read/write head follows the track along the surface of the magnetic disk. This may lead to inefficiency and errors in reading and writing information or data on the magnetic disk.

BRIEF DESCRIPTION OF THE DRAWINGS

FIG. 3 is a flowchart of a method for manufacturing a hard disk drive in accordance with embodiments of the present invention.

FIG. 4 is a flowchart of a method for reading and writing information on a disk in accordance with embodiments of the present invention.

DESCRIPTION OF EMBODIMENTS

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

The discussion will begin with a discussion of a HDD and components connected therewith. The discussion will then focus on embodiments of a method and system for unequal zoning for track following on a HDD. Rotating magnetic disks, used in HDD in embodiments of the present invention, may experience disturbances due to mechanical causes which may in turn cause off-track displacement as the read/write head follows a track on the surface of the magnetic disk. The off-track displacement may vary in a nonlinear sense across regions of the HDD. Embodiments of the present invention are directed to systems and methods for using a plurality of unequal zoning partitions which represent physical regions of the magnetic disk. With embodiments of the present invention, the plurality of unequal zoning partitions are used to compensate for the nonlinear off-track displacement.

Operation

The basic HDD model includes a magnetic storage disk or hard disk that spins at a designed rotational speed. An actuator arm with a suspended slider is utilized to reach out over the disk. The slider is coupled with a suspension that supports both the body of the slider and a head stack assembly that has a magnetic read/write transducer or head or heads for reading/writing information to or from a location on the disk.

Figure 1:
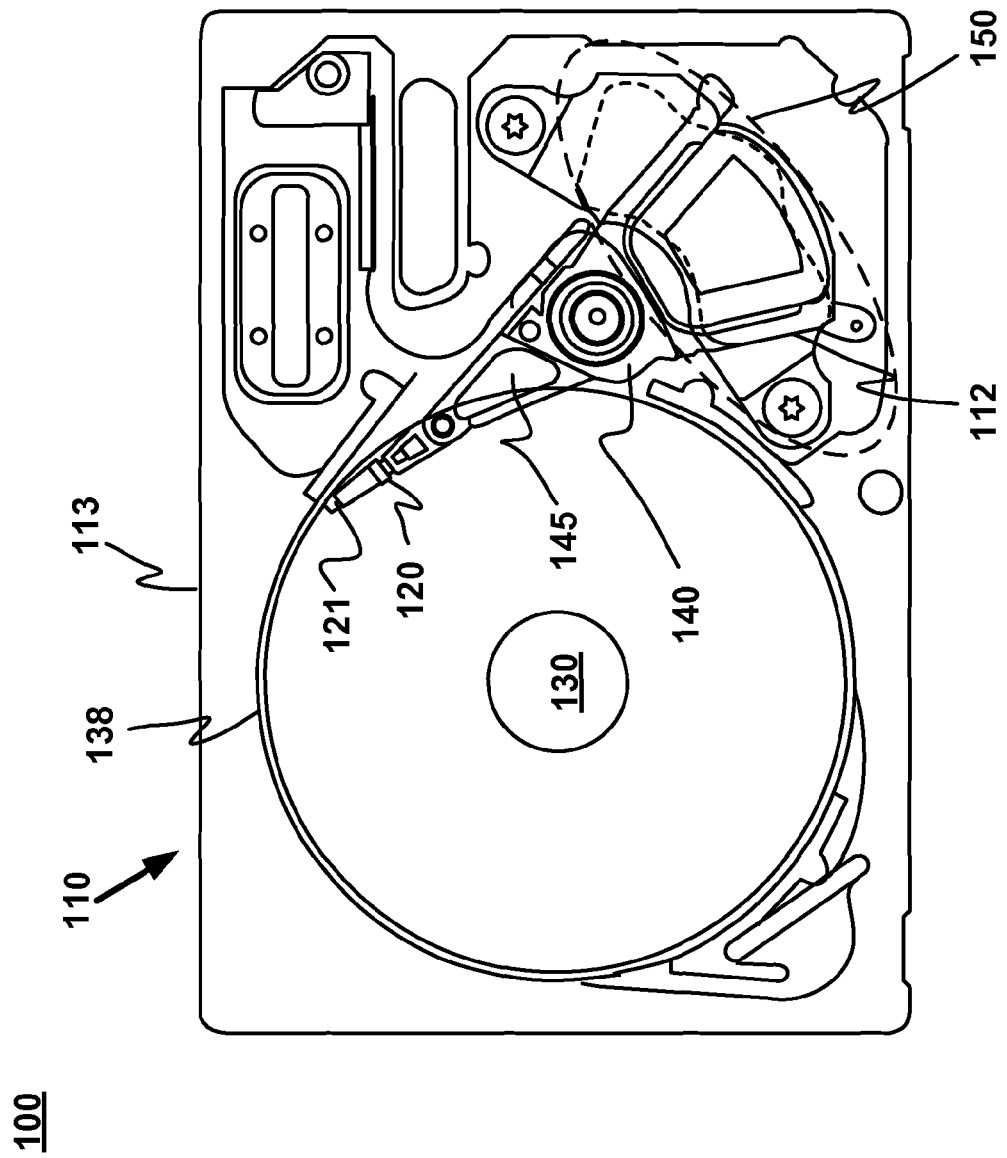
FIG. 1 is a block diagram of an HDD in accordance with embodiments of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, embodiments of the present technology are independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. A controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read/write head is called the head stack assembly.

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138.

Unequal Zoning

Figure 2:
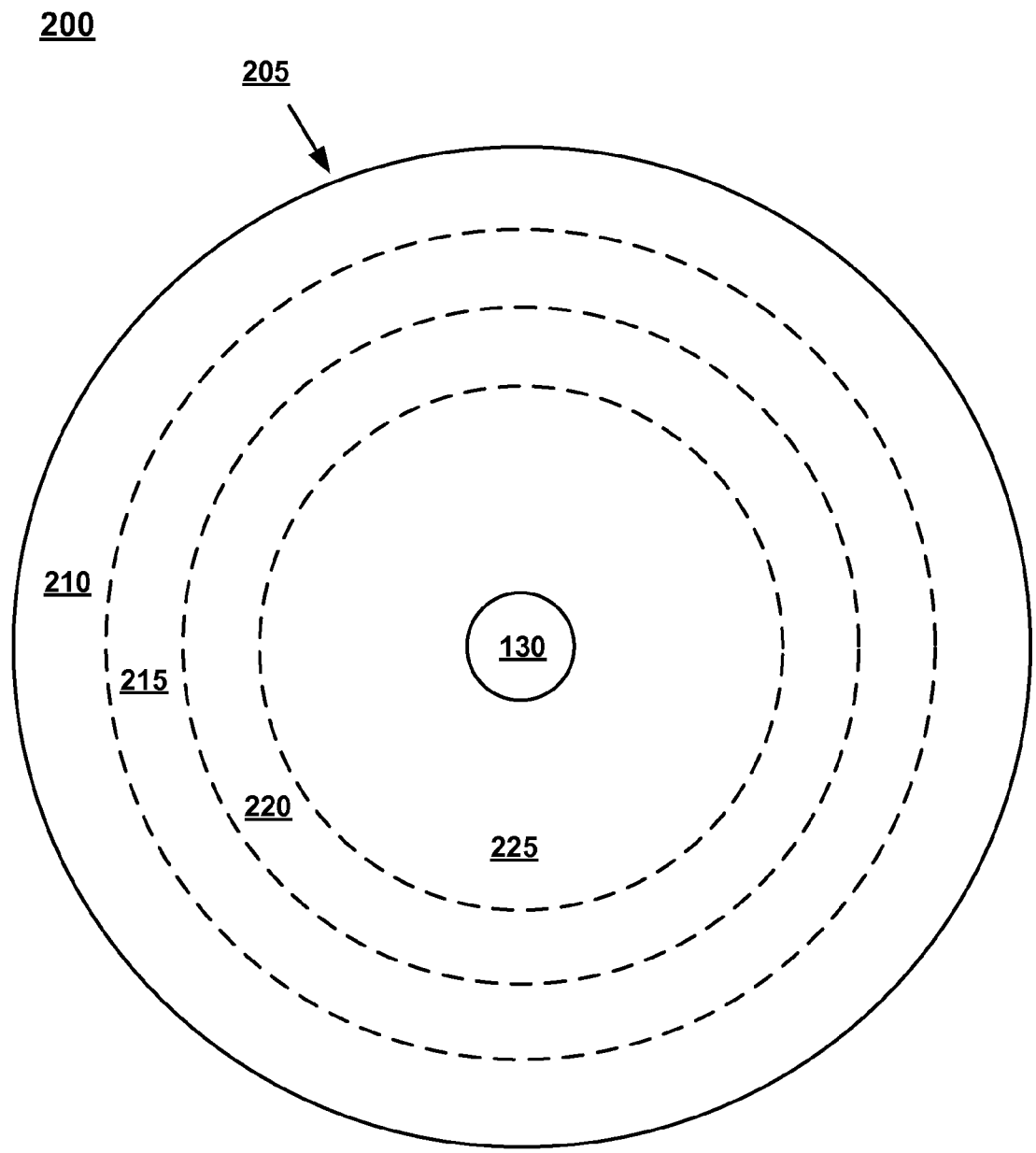
FIG. 2 is a block diagram of a magnetic disk in accordance with embodiments of the present invention.

With reference now to FIG. 2, a representation of unequal zoning of a disk. In one embodiment, disk 205 is a magnetic storage disk or hard disk that spins at a designed rotational speed and is capable of storing data or information. In one embodiment, zones 210, 215, 220, and 225 are zoning partitions, set off by dotted lines and the actual boundaries of disk 205, which represent physical regions of disk 205. It should be appreciated that embodiments of the present invention are not limited to four zoning partitions but may have any number of zoning partitions. It should also be appreciated that an increase in the number of zoning partitions leads to an increase in compensation for off-track displacement, but this increase in compensation is offset by an increase need for time and resources to create the zoning partitions and perform the computations associated with the compensation. In one embodiment, disk 205 comprises four zoning partitions as an optimal number of zoning partitions.

In one embodiment, disk 205 experiences track mis-registration error (TMR) which is a measurement of how far the read/write head deviates from the center of the track as the disk spins, this is also known as off-track displacement. In one embodiment, an instance of TMR is repeated, in the same location on the track, each instance disk 138 spins, this is known as repeatable runnout (RRO) and is harmonic in nature. In one embodiment, TMR and RRO are caused by mechanic disturbances. In one embodiment, disk 205 experiences disk flutter induced RRO as a form of mechanical disturbance. In one embodiment, disk flutter occurs when the natural frequency of disk 205 vibrations align with the motor harmonic excitation. In one embodiment, disk flutter results in disk 205 moving back and forth, or up and down, in a direction perpendicular to the plane in which disk 205 is spinning. It should be appreciated that disk flutter can result in different modes and shapes of disk vibration. In one embodiment, disk flutter results in disturbances that are different in different regions of disk 205. For example, in one embodiment, the amplitude of the disk flutter is nonlinear when measured from the outer portion of disk 205 to the inner portion of disk 205. This may results in different regions of disk 205 experiencing different degrees of RRO. Therefore a uniformed zoning scheme is not optimal for RRO cancellation.

In one embodiment, disk 205 experiences clamp distortion induced RRO, which is another cause of mechanical disturbances to disk 205. In one embodiment, clamp distortion induced RRO is caused by the screws used to mount disk 205 to the HDD assembly. In one embodiment, a clamp distortion induced RRO occurs in each location on the disk 205 where a mounting screw is applying pressure. In one embodiment, the amplitude of the clamp induced distortion RRO is nonlinear when measured from the outer portion of disk 205 to the inner portion of disk 205. In one embodiment, disk 205 experiences both clamp distortion induced RRO and disk flutter induced RRO.

In one embodiment, to compensate for RRO, including both clamp distortion induced RRO and disk flutter induced RRO, information relating to RRO is stored and forwarded to be used each time the HDD is operated. This forwarding is referred to as RRO feed forwarding (RRO FF). In one embodiment, RRO FF is used to create zones, zoning partitions, or a plurality of zoning partitions which represent physical regions of disk 205 as depicted in FIG. 2. In one embodiment, zoning partitions are used to compensate for RRO in what is also known as RRO cancelation. In one embodiment, zoning partitions of unequal sizes are used in an overall zoning scheme for RRO cancelation. In one embodiment, at least one smaller zone partition is created in a region of disk 205 where the amplitude of the RRO harmonics is changing relatively rapidly. In one embodiment, at least one larger zone partition is created in a region of disk 205 where the amplitude of the RRO harmonics is changing relatively steadily. For example, in one embodiment, the harmonic disturbances are caused by disk flutter induced RRO in which the amplitude of the RRO harmonics is changing rapidly in the outer disk (OD) portion of disk 205 and steadily in the inner disk (ID) portion of disk 205 as is shown by the curved line in FIG. 5.

Figure 6:
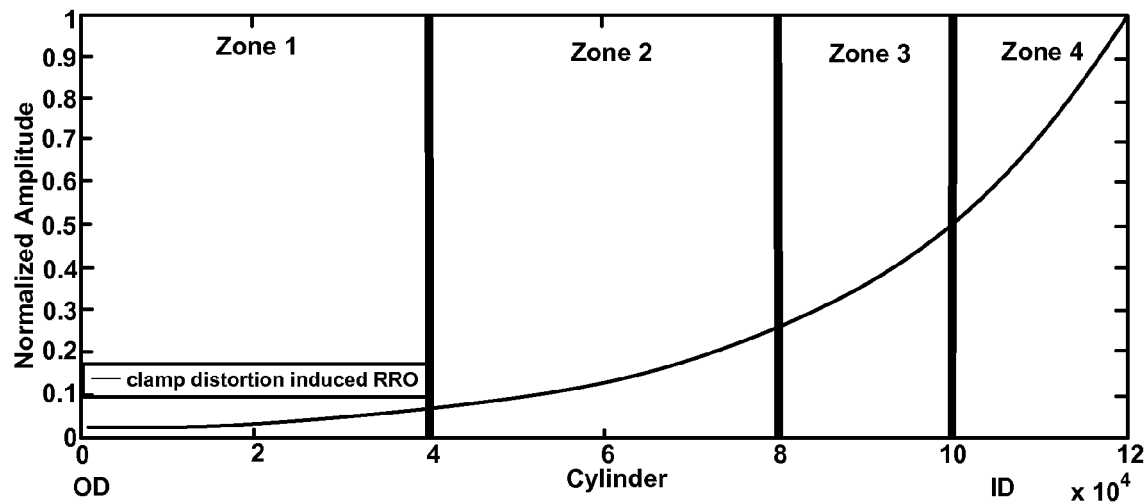
FIG. 6 is a chart of unequal zoning partitions and disturbances of a disk in accordance with embodiments of the present invention.

In one embodiment, the harmonic disturbances are caused by clamp distortion induced RRO in which the amplitude of the RRO harmonics is changing rapidly in the ID portion of disk 205 and steadily in the OD portion of disk 205 as is shown by the curved line in FIG. 6.

Thus, in embodiments where the amplitude changes across the ID and OD portions of disk 205 in a nonlinear fashion, such as an exponential curve, unequal sized zoning partitions will allow for smaller zoning partitions where the amplitude changes more drastically. By allowing for the smaller zoning partitions in areas where the amplitude changes more drastically, better computations for compensations may be made for RRO cancelation and thus control, to an extent, the known off-track displacements.

Figure 5:
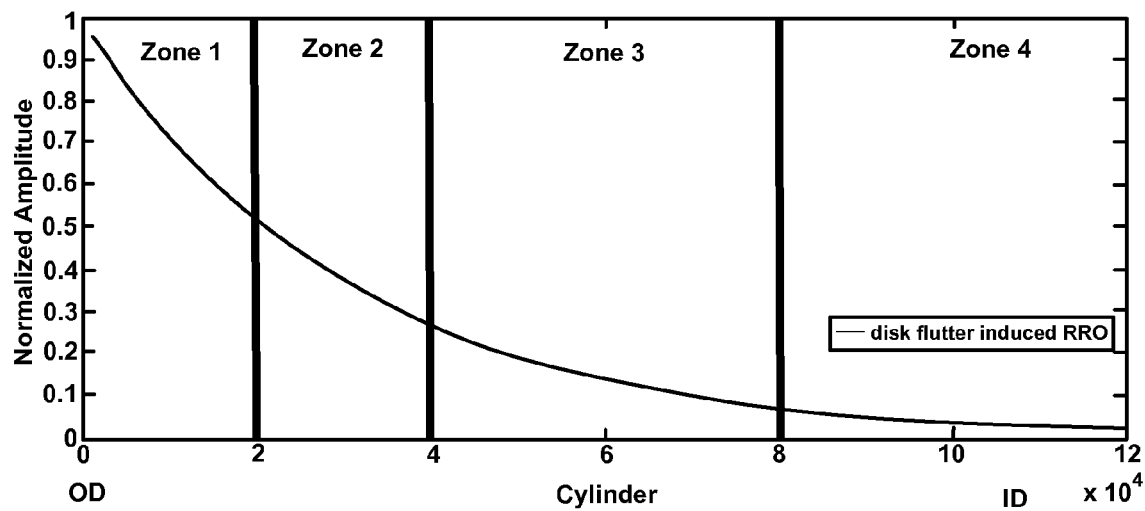
FIG. 5 is a chart of unequal zoning partitions and disturbances of a disk in accordance with embodiments of the present invention.

In one embodiment, the size of the plurality of unequal zoning partitions is decided based on information obtained by amplitude modeling of the RRO as is shown in FIG. 5 and FIG. 6. In one embodiment, the amplitude modeling and creating of unequal zoning partitions takes place during the manufacture phase of the HDD. In one embodiment, the creating of unequal zoning partitions takes place at the design phase of the HDD. In one embodiment, after the creation of the unequal zoning partitions, the size of the zones is not changed again throughout the life of the HDD.

In one embodiment, RRO cancelation or compensation is implemented by assigning a constant value to a given partitioned zone of the actuator stroke. In such an embodiment, the constant value is then used in computations to compensate for the RRO uniformly across that particular zoning partition. In one embodiment, the RRO cancelation or compensation takes place by moving the read/write head of the HDD. In one embodiment, this movement of the read/write head is accomplished by moving actuator arms 145 of FIG. 1. In one embodiment, RRO cancelation or compensation is accomplished by using controller 150 of FIG. 1 to move actuator arms 145. Thus by moving the read/write head at appropriate times, RRO cancelation can be accomplished and the read/write head is better able to follow the track along the surface of disk 205.

In one embodiment, information regarding the size of the unequal zoning partitions is stored in hardware components of the HDD. For example, in one embodiment, the HDD has on-board memory, such as a cache, and processing abilities that allow for the creation and storage of unequal zoning partitions. In one embodiment, a hardware module may be created and installed as part of the HDD and has only the purpose of storing information regarding unequal zoning partitions and information regarding compensation for RRO cancelation. In one embodiment, controller 150 of FIG. 1 is designed and manufactured in such a way to allow for the storing information regarding unequal zoning partitions and information regarding compensation for RRO cancelation. It should be appreciated that storing information regarding unequal zoning partitions and information regarding compensation for RRO cancelation can be accomplished using hardware, or software and firmware in conjunction with hardware.

FIG. 3 is a flowchart of a method 300 for manufacturing a hard disk drive comprising at least one magnetic disk, a read/write head connected to at least one actuator arm and capable of reading and writing data on said at least one magnetic disk, a controller capable of moving said at least one actuator arm, in accordance with one embodiment of the present invention.

At 302, a track is followed using the read/write head on the surface of the at least one magnetic disk.

At 304, information is stored at the controller regarding off-track displacement of the read/write head. In one embodiment, computer readable memory coupled with the HDD, including the controller, is used to store the information. In one embodiment, a computer system external to the HDD is used to temporarily store the information during the manufacture process.

At 306, a plurality of unequal zone partitions is created, wherein an unequal zone partition of the plurality of unequal zone partitions represents a physical region of the at least one magnetic disk and wherein the plurality of unequal zone partitions are based on the information regarding the off-track displacement of the track and are used by the controller to compensate for the off-track displacement of the track.

FIG. 4 is a flowchart of a method 400 for reading and writing information on a disk in accordance with one embodiment of the present invention.

At 402, a magnetic disk capable of storing data is rotated.

At 404, a track is followed on the surface of said magnetic disk with a read/write head capable of reading and writing information on said magnetic disk.

At 406, unequal zone partition information is accessed wherein said unequal zone partitions represent physical regions of said magnetic disk.

At 408, off-track displacement of said track on said surface of said magnetic disk is compensated for by moving said read/write head using a different constant value of compensation for each said unequal zone partition.

Thus, embodiments of the present invention provide a method and apparatus for unequal zoning for track following on a hard disk drive.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for manufacturing a hard disk drive comprising at least one magnetic disk, a read/write head connected to at least one actuator arm and capable of reading and writing data on said at least one magnetic disk, a controller capable of moving said at least one actuator arm, the method comprising:
    following a track using said read/write head on the surface of said at least one magnetic disk;
    storing information at said controller regarding off-track displacement of said read/write head; and
    creating a plurality of unequal zone partitions, wherein an unequal zone partition of said plurality of unequal zone partitions represents a physical region of said at least one magnetic disk and wherein said plurality of unequal zone partitions are based on said information regarding said off-track displacement of said track and are used by said controller to compensate for said off-track displacement of said track.

2. The method of claim 1, further comprising compensating for said off-track displacement of said track by moving said at least one actuator arm using a different constant value for said unequal zone partition.

3. The method of claim 1, wherein said off-track displacement is repeatable as said at least one magnetic disk spins.

4. The method of claim 1, wherein said off-track displacement is caused by clamp distortion.

5. The method of claim 1, wherein said off-track displacement is caused by disk flutter.

6. The method of claim 1, wherein said off-track displacement varies in a non-linear fashion from the inner portion of said at least one magnetic disk to the outer portion of said at least one magnetic disk and said unequal zone partitions are created in such a way that at least one said plurality of unequal zone partitions is relatively smaller and comprises a region of said at least one magnetic disk where said off-track displacement varies relatively rapidly.

7. The method of claim 1, wherein said information regarding said off-track displacement comprises information regarding fixed phases of harmonics in relation to said at least one magnetic disk.

8. The method of claim 6, wherein said creating said plurality of unequal zone partitions further comprises creating at least one smaller zone partition which represents a region of said at least one magnetic disk where the amplitude of said harmonics is changing relatively rapidly.

9. The method of claim 6, wherein said creating said plurality of unequal zone partitions further comprises creating at least one larger zone partition which represents a region of said at least one magnetic disk where the amplitude of said harmonics is changing relatively steadily.

10. A disk drive system comprising:
    at least one magnetic disk;
    a read/write head configured to read and write data on said at least one magnetic disk by track following on a surface of said at least one magnetic disk;
    an actuator arm configured to move said read/write head in relation to said at least one magnetic disk;
    a plurality of unequal zone partitions, an unequal zone partition of said plurality of unequal zone partitions represents a physical region of said at least one magnetic disk, wherein said plurality of unequal zones are based on information regarding off-track displacement of said track and used to compensate for said off-track displacement of said track; and
    a controller configured to move said actuator arm and store information regarding said plurality of unequal zone partitions.

11. The disk drive system of claim 10, wherein said controller is further configured to compensate for said off-track displacement of said track by moving said at least one actuator arm with said controller using a different constant value for each of said unequal zone partitions.

12. The disk drive system of claim 10, wherein said off-track displacement is repeatable as said at least one magnetic disk spins.

13. The disk drive system of claim 10, wherein said off-track displacement is caused by clamp distortion.

14. The disk drive system of claim 10, wherein said off-track displacement is caused by disk flutter.

15. The disk drive system of claim 10, wherein said off-track displacement varies in a non-linear fashion from the inner portion of said at least one magnetic disk to the outer portion of said at least one magnetic disk and said plurality of unequal zone partitions are created in such a way that at least one said plurality of unequal zone partitions is relatively smaller and represents a region of said at least one magnetic disk where said off-track displacement varies relatively rapidly.

16. A method for reading and writing information on a disk comprising:

rotating a magnetic disk capable of storing data;

following a track on a surface of said magnetic disk with a read/write head capable of reading and writing information on said magnetic disk;

accessing information regarding a plurality of unequal zone partitions, an unequal zone partition of said plurality of unequal zone partitions represents a physical region of said magnetic disk; and compensating for off-track displacement of said track on said surface of said magnetic disk by moving said read/write head using a constant value for compensation for each said unequal zone partition, wherein said constant value for compensation is different for each said unequal zone partition.

17. The method of claim 16, wherein at least one of said unequal zone partitions is a relatively smaller zone partition and represents a region of said magnetic disk where the amplitude of said off-track displacement is changing relatively rapidly.

18. The method of claim 16, wherein at least one of said unequal zone partitions is a relatively larger zone partition and represents a region of said magnetic disk where the amplitude of said off-track displacement is changing relatively steadily.

19. The method of claim 16, wherein said off-track displacement is caused by clamp distortion.

20. The method of claim 16, wherein said off-track displacement is caused by disk flutter.

* * * * *